March 13, 1934.  H. GALLUSSER  1,951,014
AUTOMATIC SLACK ADJUSTER
Filed Jan. 2, 1932  3 Sheets-Sheet 1
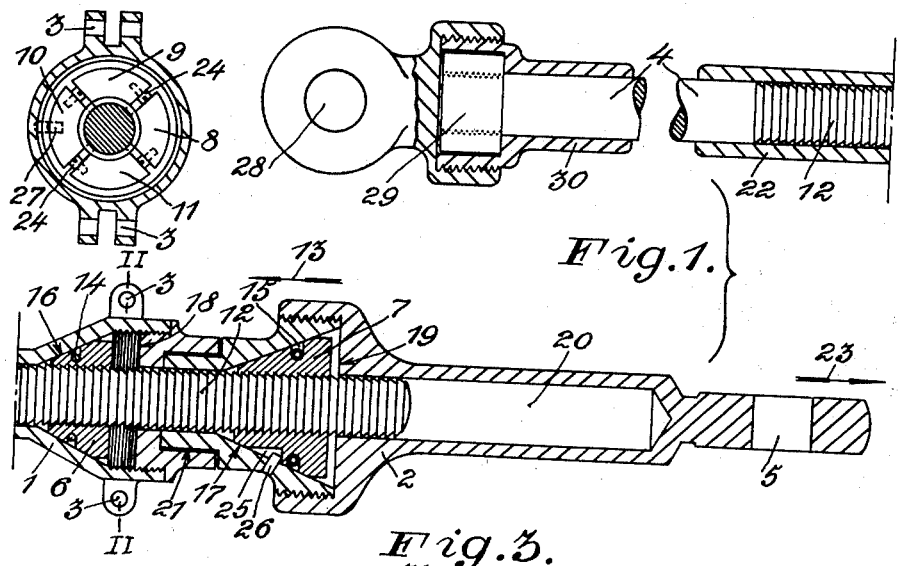
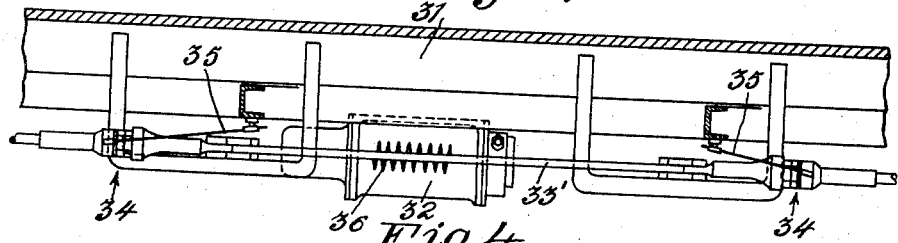
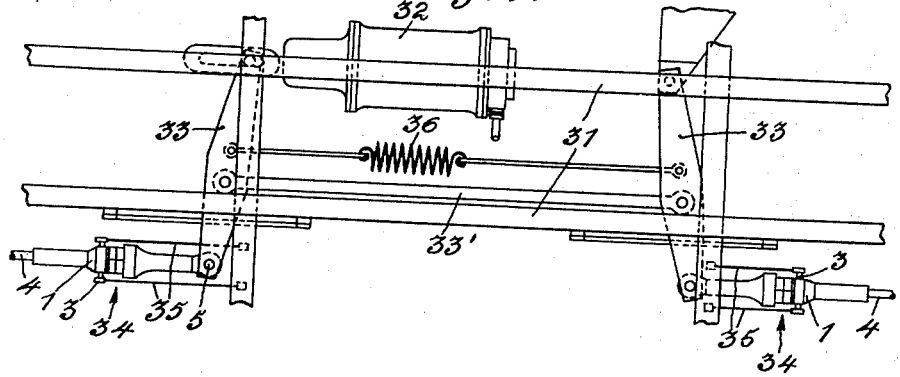
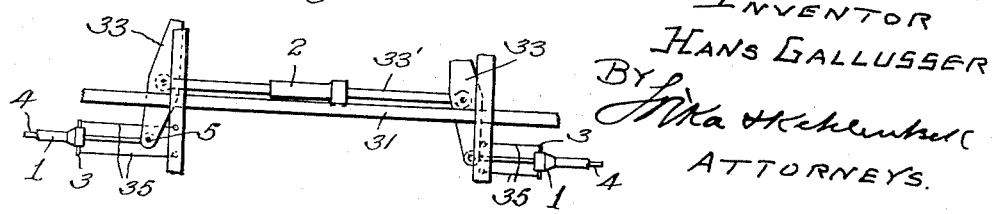
INVENTOR
HANS GALLUSSER
BY
ATTORNEYS.

March 13, 1934.                H. GALLUSSER                1,951,014
                          AUTOMATIC SLACK ADJUSTER
                           Filed Jan. 2, 1932                3 Sheets-Sheet 2
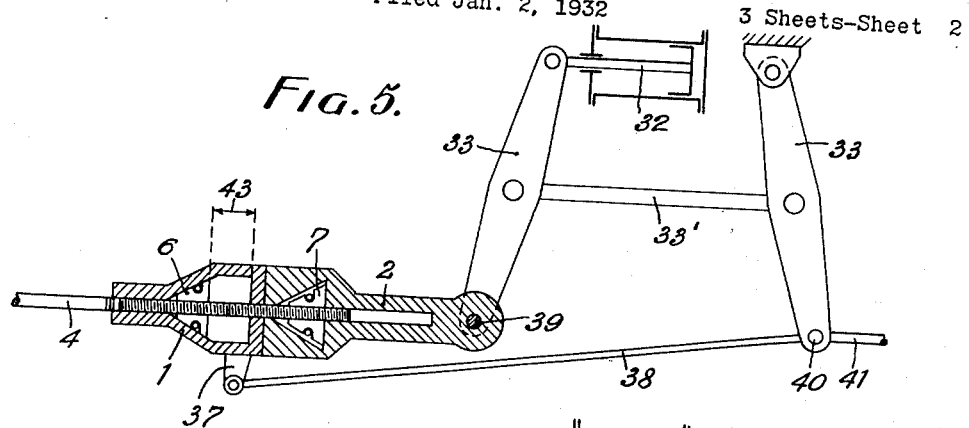
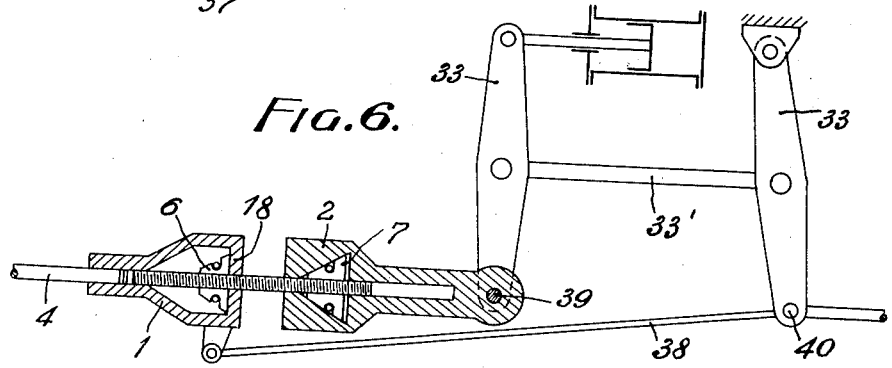
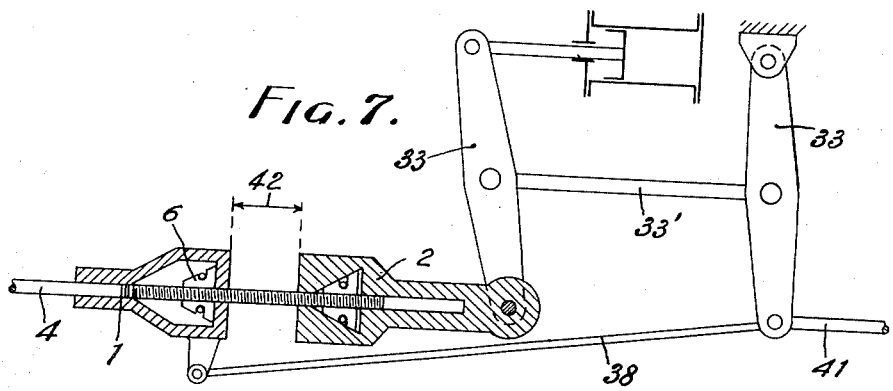
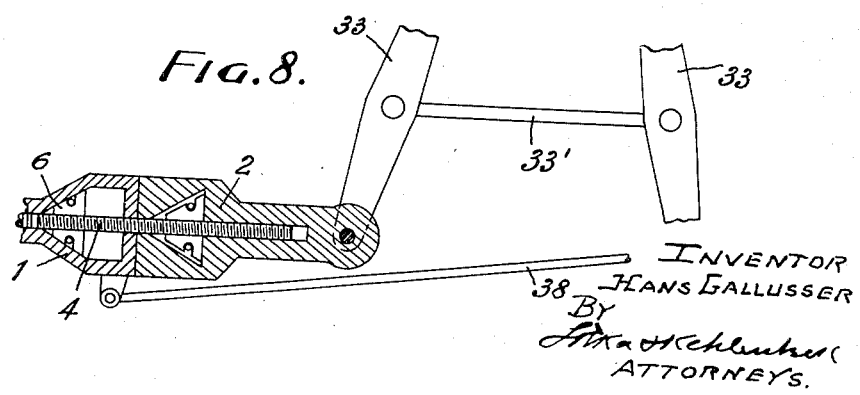

March 13, 1934.  H. GALLUSSER  1,951,014
AUTOMATIC SLACK ADJUSTER
Filed Jan. 2, 1932  3 Sheets-Sheet 3
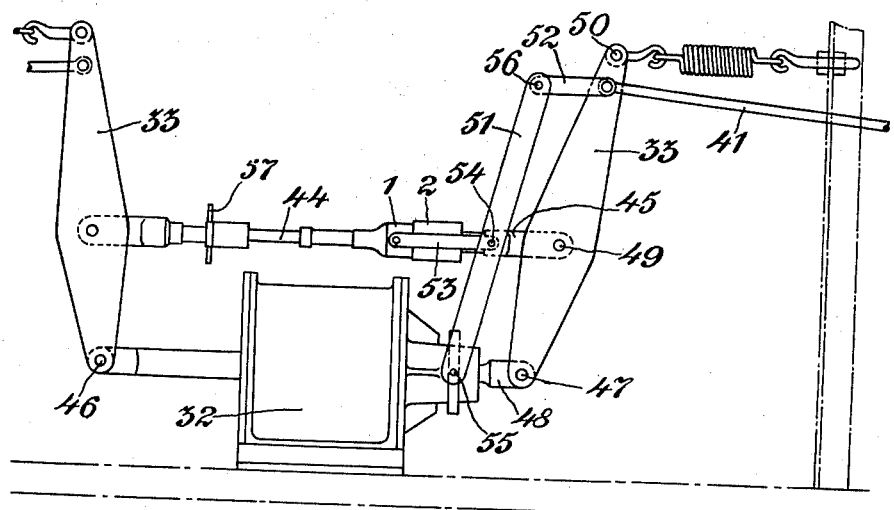
Fig. 9.
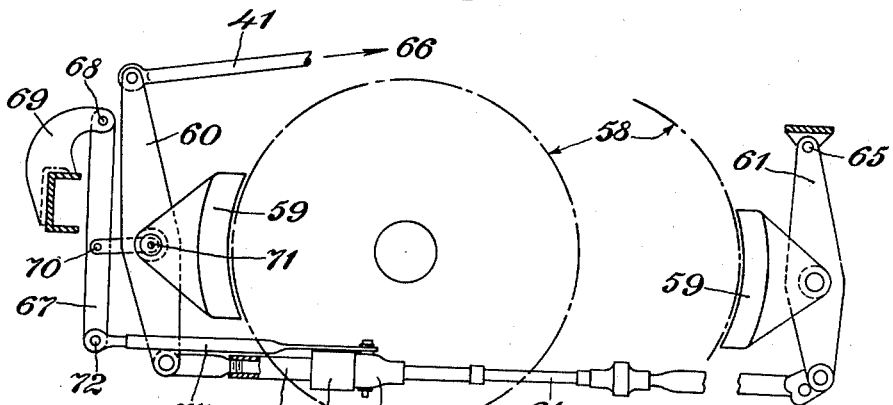
Fig. 10.
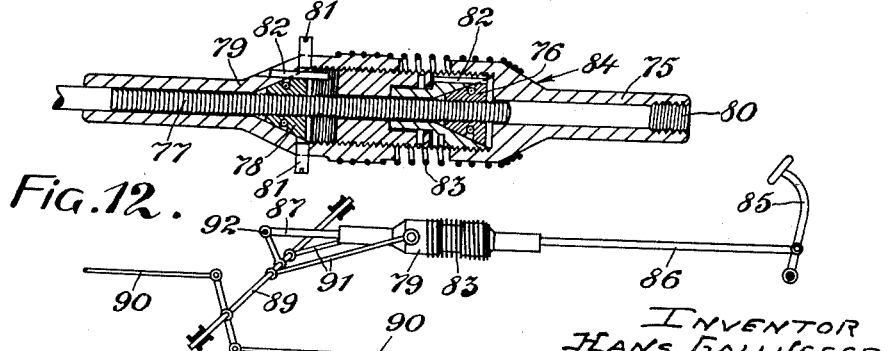
Fig. 11.
Fig. 12.
INVENTOR
HANS GALLUSSER
BY
ATTORNEYS.

Patented Mar. 13, 1934

1,951,014

UNITED STATES PATENT OFFICE

1,951,014

AUTOMATIC SLACK ADJUSTER

Hans Gallusser, Geneva, Switzerland

Application January 2, 1932, Serial No. 584,464
In France January 13, 1931

11 Claims. (Cl. 188—200)

Various devices are already known whose object is to automatically take up the play resulting from the wear on brake shoes or bands, the stretching of the parts of the brake rigging etc.

Such devices are actuated, for example, by the energy provided by the gas suction of a combustion motor. The use of such devices is naturally limited to motor vehicles only.

Other known devices used on railway vehicles are, on the contrary, entirely mechanical, but present the disadvantage of having a large number of springs, which is not at all conducive to the absolutely reliable functioning of the device.

Finally, in the known devices, mechanisms exist in which the margin for taking up the play is too limited for the use for which the device is intended.

The device according to the invention, which is located, like the known devices, on an element of the brake rigging and which more particularly comprises pawls formed by clamps which are able to move in one direction only on a toothed or threaded rod of this brake rigging, possesses the further advantage of entirely eliminating the above-mentioned objection.

This device is a purely mechanical one working independently of the motor, that is to say, adaptable to any kind of vehicle, particularly railway vehicles.

It includes no spring having an important function upon which the reliability and efficiency of the operation is dependent.

In short, the device is capable of instantaneously taking up any play, whatever its extent.

This device is characterized by two clamps each composed of a plurality of parts forming a nut member, said parts being yieldingly connected together by elastic means and the exterior conical surfaces of which produce, under traction, the coupling of the toothed or threaded rod with the organs with which it is intended to co-operate; each clamp is arranged to move between two abutments, one of which is conical, the distance between the abutments of one of the clamps, called the compensating clamp, determines the play allowed to the brake elements, and the distance between the abutments of the other of said clamps, called the coupling clamp, being just sufficient to allow this clamp to be disengaged from the teeth or threads of the rod on which it is situated and these latter abutments forming part of the elements with which the rod co-operates.

The annexed drawings show, by way of example, several forms of execution of a device according to the invention.

Fig. 1 shows, in longitudinal section, a device intended for a railway vehicle;

Fig. 2 is a cross section on the line II—II of Fig. 1;

Figs. 3 and 4 show in side-view and section respectively, the chassis or frame of a railway vehicle, with a compressed air brake and device for taking up the play, according to Figs. 1 and 2;

Fig. 4a is a fragmentary view diagrammatically illustrating another embodiment of the invention;

Figs. 5 to 10 show three different ways of placing the device on the brake rigging of a brake;

Fig. 11 shows, in longitudinal section, a device intended for a motor vehicle;

Fig. 12 shows diagrammatically the installation of the device indicated in Fig. 11 in an automobile brake rigging.

The device according to Figs. 1 and 2 is provided with two boxes or casings 1 and 2 comprising abutments, one, 1, of these boxes can be rendered immovable by means of two eyelets 3, while the other box 2, connected to the rod of the brake rigging, controlling side, transmits the force caused by putting on the brake to the rod of the brake rigging 4.

The operating means may be connected to the box 2 by means of the eyelet 5.

In each of the boxes is found a clamp 6 and 7 respectively, 6 being the clamp for taking up the play and 7 the coupling clamp, according to the use for which they are intended. Each clamp constitutes a nut member in four parts, such as, for example, 8, 9, 10, 11 the threads of which correspond to the threads 12 of the rod 4 which are of saw-tooth form and constitute a helical rack. Due to this saw-tooth form of the threads used, the two clamps may move on the rod 4 in the direction of the arrow 13 only.

To allow this displacement, the parts or segments such as 8, 9, 10, 11, constituting the clamps, are yieldingly held together by means of a circular spring situated in the corresponding slots 14 and 15 respectively of the two clamps.

The abutments between which the two clamps are able to move are of two kinds; they are conical at 16 and 17 similar to the corresponding surfaces of the clamps and flat at 18 and 19 similar to the corresponding bases of the clamps.

It may be seen from the drawings that a pull exerted on the device jams the clamps in their conical parts 16 and 17, which results in their being firmly applied against the teeth or threads of the rod 4; the latter is thus rigidly coupled to the boxes or casings and cannot under any circumstances become disconnected from or moved relatively to said casings in the direction of the arrow 23.

With the arrangement set forth the rod 4 can, on the other hand, be advanced in the opposite direction indicated by the arrow 13, the clamps then leaving the conical surfaces 16 and 17 in order to follow the said rod 4 and opening slightly as the rod advances to permit them to jump from one to the other of the threads 12. This operation takes place when the clamps meet the abutments 18 and 19.

Finally, the drawings show that the movement of the compensating clamp 6 between the abutments 16 and 18 is greater than that of the coupling clamp between the abutments 17 and 19. As will be seen from the following description, the movement of the compensating clamp 6 determines the play allowed to the brake parts, while the movement necessary to the coupling clamp must be just sufficient to allow this latter to open slightly to form a passage for the rod 4.

The box 2 terminates in a hollow cylindrical body 20 and as indicated at 21 partially extends into the box 1, this construction being provided in order to constantly protect the threads 12 during the movement of the rod 4 or while the two boxes move in relation to each other. For the same reason the box 1 terminates in a tubular part 22.

Supposing now that the device described operates to effect a taking up of the play.

In order to apply the brakes on, a pull is exerted on the box 2, in the direction of the arrow 23, this pull is transmitted to the rod 4, to the other parts of the brake rigging and finally to the brake shoes, the whole being accomplished by means of the coupling clamp 7 whereby the box 2 is rigidly coupled to the rod 4.

Then the whole device moves in the direction of the arrow 23 with the exception of the box 1 which is immovable.

The construction is arranged in such a way that for a brake which does not necessitate a taking up of the play, the application of the brakes does not necessitate a movement greater than to that allowed to the compensating clamp 6 in its box 1.

But assuming that it is a question of a brake which necessitates taking up of undesirable play, it is clear that the displacement of the device will be greater, so that the box 2, the coupling clamp 7 and the rod 4 will continue to move after the compensating clamp 6 has met the abutment 18. This clamp 6 is then caused to jump from thread to thread on the rod which continues to move, the relative movement of the clamp and of the rod being determined by the difference between the movement actually necessary for putting on the brakes and the movement which is theoretically necessary when the brake is well regulated. This relative movement is a measure of the amount of play required to be taken up; that is, it determines the length by which the rod 4 must be shortened, in its return movement when the brake is released.

In short, when the brake is released, the rod 4 can only retreat by a distance corresponding to the movement allowed to the compensating clamp 6, because as soon as this latter comes to bear against the cone 16, any movement of the rod 4 in the direction of the arrow 13 is immediately rendered impossible.

But when the compensating clamp rigidly connects the rod 4 and the box 1, there remains between the boxes 1 and 2 a space equivalent to the extent of the taking up of the play. If at this moment, the elements, having produced the brake action by means of the box 2, return to their original position, it is evident that the box 2 will effect the same movement and come to rest against the box 1, while the coupling clamp 7 moves a corresponding distance along the threads 12. This operation shortens the brake rigging, in this case the rod 4, to an extent corresponding to the measure of taking up the play previously described.

Therefore, and in a single operation, the play of the brake, no matter what its extent, has been taken up and this by means of elements which, independently of any outside influence, present absolute security. In fact, even if for one reason or another, the springs retaining between them the segments of the clamps 6 and 7 did not act, at least three of these segments would be carried along by the rod and would produce, without impediment, the desired coupling. It is also necessary to note that the form of the spring chosen, that is to say the small cylindrical spiral spring coiled in the form of a ring, is one of the most satisfactory from the point of view of security and that the clamps in their box can only move in a space just necessary and sufficient for their functioning.

In order to assure this, the segments 8, 9, 10 and 11 of the clamps are provided with lateral screws 24 having heads the height of which is such that said segments are maintained in evenly spaced relation in a circumferential direction. Thus all play in said circumferential direction between said segments of the clamp is eliminated and it is impossible for the four segments 8, 9, 10 and 11 to be forced into engagement with each other, and consequently axial displacement of said segments relatively to each other by the action of the threads, which would follow any relative circumferential movements of the segments, is avoided.

Further, at least one of the segments of each clamp, and accordingly each clamp is fixed against any possible rotary movement about the rod 4, this being accomplished for instance by means of a groove 25 and a taper-pin such as 26 or 27. This further presents the advantage that when the worn brake shoes are replaced by new ones, the rod 4 is allowed to return to its original position by a simple rotation, the rod being thus unscrewed inside the clamps which are prevented from turning.

Fig. 1 also shows how the rod 4 is connected to the eyelet 28 which is intended to be connected with the rest of the brake rigging. This connection is such that the rod 4 can turn about its axis in order that the former may be unscrewed and brought back into its original position without it being necessary to take the device apart.

With this in view, an annular head 29 is fixed on the rod 4 and this head transmits the pull of the eyelet 28 by means of a screw 30.

In order to facilitate the movement of the clamps along the threads 12 and to avoid the production of small particles of metal which may hinder the effective working of the device, it is preferable that the sharp edges of the threads be smoothed down, for instance, by passing the rod rapidly over a lathe.

Figs. 3 and 4 show an example of the use of the device with an air brake. To the chassis or frame 31 of the vehicle is fixed the brake cylinder 32 acting upon one of the two levers 33 to which are fixed the rods 4 of the brake rigging. Upon each of these rods is situated, at 34, a device similar to that of Figs. 1 and 2. The box 1 of the device is rendered immovable by means of rods 35 fixed to the eyelets 3.

The spring 36, which serves to bring the parts of the brake back into their original position each time after the brakes have been used, causes the displacement of the clamps on their respective rods 4, at each operation for taking up the play.

Figs. 5 to 7 show another arrangement of the device in the case of a brake similar to the preceding one. This arrangement differs from the preceding one in that it only necessitates one device instead of two. At 32 is again illustrated the brake cylinder acting upon one of the two levers 33 connected, as in the preceding case, by a rod 33'. The two boxes 1 and 2 of the device, containing their clamps 6 and 7 are diagrammatically represented and it is seen that the box 1, instead of being rigidly connected to the chassis or frame is connected by means of the lug 37 and the rod 38 to that one of the levers 33 upon which the device does not directly act. In other words, the box 2 is pivoted at 39 on the lever 33 to the left in the drawings, while the box 1 is pivoted at 40 to the lever on the right.

Fig. 5 shows this device in its position of rest, the rod 4 occupying a certain position in relation to the two boxes 1 and 2 and the other rod of the brake rigging 41 in no way differing from its usual position.

When the brakes are applied, the elements first assume the position represented in Fig. 6. The ends 39 and 40 of the two levers 33 approach each other, by an oscillating movement about the ends of the rod 33' which connects them, the two boxes 1 and 2 moving apart to a corresponding extent; while the clamp 7 during this operation maintains the box 2 and the rod 4 rigidly coupled together, the clamp 6 comes to bear against the abutment 18 of the box 1.

If the brake has too much play and a taking up of this play is necessary, the two levers 33 will continue their oscillating movement until they come into the position indicated in Fig. 7. At this stage the boxes 1 and 2 will be still further apart, and the clamp 6 will be displaced correspondingly on the rod 4.

The distance 42 by which the boxes 1 and 2 will be separated from each other represents a measure of the taking up of the play to be effected, not on one wheel only of the vehicle but on the two groups of wheels, one of which is controlled by the rod 4 and the other by the rod 41. Because the device and the brake rigging are interconnected by the rod 38, the play of the former is increased by an extent corresponding to the play between each brake shoe and its corresponding wheel.

When the brake is released and the levers 33 return to the position indicated in Fig. 8, the two boxes 1 and 2 again come into contact with each other, the clamp 6 having shortened the rod 4 to an extent equivalent to the difference between the lengths 42 and 43.

Another method of using a single device in the case of an air brake, that is to say, in a case similar to that of Figs. 5 to 8, is represented in Fig. 9. The device constituted by the boxes 1 and 2 is here situated on the connecting rod between the centres of rotation of the levers 33, this rod being divided into two parts 44 and 45 and the clamps being placed on the part 44, while the box 2 of the coupling clamp forms part of the box 45.

While the pivot 46 of the lever 33 on the left of the drawings is a fixed point, the pivot 47 of the lever on the right is displaced when the brake is applied this being due to the pressure exerted by the piston rod 48 controlled by the cylinder 32.

The lever 33 at the right is pivoted at 49 to the rod formed by the parts 44, 45 while at the end of this lever opposed to the pivot 47, one of the rods 41 of the brake rigging is pivoted at 50. An auxiliary lever 51 located in its rest position approximately parallel to the lever 33 on the right, is connected on the one hand to the pivot 50 of this lever by a short rod 52 and on the other hand to the box 1 of the device by short rods 53 pivoted at 54, this lever being further pivoted at 55 on the cylinder 32.

While the distance between the pivots 50 and 56 of the short rod 52 is constant, the distance between the pivots 47 and 55 is not constant, because when the brake is applied the pivot 47 moves away from the cylinder 32, therefore from the pivot 55. The applying of the brakes accordingly results in displacing the ends 47 and 55 of the levers 33 and 51, these levers then forming an angle which will increase in obtuseness in proportion as the application of the brakes necessitates a more extensive movement of the piston rod 48. But as the extent of this movement depends upon the play existing between the brake shoes and the wheel rims, it may also be said that this angle will be more obtuse the greater the extent of this play.

As the pivots 47 and 55 move apart, the pivots 49 and 54 also move apart and in equal proportion, if care is taken to give the two levers predetermined equal dimensions, or at least proportional dimensions.

The boxes 1 and 2, one of which is joined to the pivot 54 and the other to the pivot 49, move away from each other when the brakes are applied, their distance apart being dependent upon the extent of displacement of the shoes, and when the operation of applying the brakes is terminated these boxes will move towards each other over this same distance.

This movement of the two boxes to and from each other corresponds to that already described and will have as its final result, if this moving away is greater than the play allowed to the compensating clamp, a shortening of the unit, formed by the parts 44 and 45. This shortening, which brings the central pivoting points of the two levers 33 nearer together, at the same time brings the brake shoes nearer to their respective wheel rims. A coupling of a kind similar to that of the rod 4 with the eyelet 28 of Fig. 1 is further provided at 57, permitting, by rotation of rod here designated in 44, a lengthening of unit 44, 45 when the worm shoes are replaced by new ones.

Moreover, according to Fig. 10, the device may be placed on a bogie on the rod establishing the connection between the shoes of the two wheels of the bogie. These two wheels are represented at 58 and their respective shoes at 59. A brake rod 41 acts upon these shoes by means of the levers 60 and 61 joined together by the rod in two parts 63, 64, the first of which forms part of the box 2 of the device, while the box 1 surrounds the compensating clamp situated, together with the coupling clamp, on the rod 64. The pivot 65 of the lever 61 is fixed and it is easy to envisage the working of the brake when a pull is exerted on the brake rod 41 in the direction of the arrow 66.

An auxiliary lever 67 is also provided, and has its one end pivoted to a fixed element 69 of the chassis or frame, the centre 70 of said lever 67 being connected by means of a short rod to the pivoting point 71 of the shoe 59 on the lever 60, and its free end 72 being connected by another short rod 73 to the box 1 of the device.

When the brake is applied, that is to say, when the rod 41 is pulled in the direction of the arrow 66, the lever 60 pivots in a clockwise direction round the point 71 which moves slightly towards the right in the drawings, until the shoe 59 comes to bear against the rim of the wheel. A pull is thereby developed on the rod 63, 64 in the direction of the arrow 74, so that the box 2 of the device will tend to move in this direction, while the displacement of the shoe 59 and the pulling by it of the pivot 70 of the auxiliary lever 67, produces a displacement of the box 1 of the device in the opposite direction to that indicated by the arrow 74.

The two boxes of the device again move apart to an extent which is in proportion to the extent of the movement necessary to the shoes in order to effect the brake action, if care has been taken to make the levers 60 and 67, if not equal, at least proportional.

The brake action being terminated, the reverse movements take place and the boxes 1 and 2 come together, shortening the length of the rod 63, 64 of their preceding distance apart was greater due to the shoes being worn, than the extent determined by the play which it is desired to allow to these shoes.

The device described with reference to Figs. 1 and 2 of the drawings is constituted as a unit comprising the organs for taking up the play as well as the coupling means. This arrangement is also the simpler. However, there is nothing to prevent these organs, whose function is different, from being separated.

For instance, in the construction shown in Figs. 3 and 4, a coupling organ, that is, a box 2 with its clamp 7, may, as shown in Fig. 4ᵃ, be placed on the rod 33′ connecting the two levers 33 and only one organ for taking up the play, that is, a box 1 with a clamp 6, located at the two points 34, that is to say, at each of these two points.

Figs. 11 and 12 represent a device similar to the preceding one, but more particularly applicable to motor vehicles.

The brake action is transmitted by means of the box 75 to the clamp 76 and from there to the rod 77 which in its turn transmits it to the brake elements, this rod being provided with saw-like teeth similar to those already described. The clamp 76 constitutes the coupling clamp in front of which is placed the compensating clamp 78 located in the second box 79. The two clamps together with the two boxes are constructed and operate substantially in the manner previously described.

The coupling of the box 75 with the controlling means and the fixation of the box 79 however is slightly different.

The coupling of the box 75 with the controlling means is effected by means of a threaded part 80 and the fixation of the box 79 is accomplished by means of screws 81. Finally, the bolts 82 are provided to prevent all relative rotation of the clamps.

A spring 83 surrounds the whole device and is intended to draw the two boxes 75 and 79 one within the other. This spring is screwed upon the external surface of the box 79 and acts upon the box 75 by engagement with the conical surface of this latter. This arrangement has the advantage of allowing the immediate replacement of the spring which always remains visible and is readily accessible.

The device represented in Fig. 12 functions in exactly the same way as the preceding one, so that it is not necessary to give a complete description of same.

The brake pedal 85 transmits the brake action to the brake rigging 86 which transmits it by means of the device, from the brake rigging 87, the lever 88, the shaft 89 etc., to the parts of the brake rigging 90 which in their turn act upon the brakes. The coupling and compensating clamps act in the manner already described and when the pedal is released, the different elements are brought back into their original positions by the spring 83. It is evident that this spring may be omitted provided that the pedal itself is provided with a corresponding spring.

It should be noted that in the example represented, the box 79 instead of being fixed to the chassis or frame of the vehicle, is joined to the shaft 89 by means of rods 91. Due to this arrangement, the relative movements between the chassis and the brake rigging, movements resulting for instance from the elastic construction of the vehicle, do not interfere with the exact taking up of the play effected by the device. If, in addition, any deformation of the shaft 89 occurs, this deformation has no effect. It is evident that this mode of fixation can also be applied to the device as first described; in the same way in the present case, the eyelet coupling 92 may be replaced by a coupling of the kind illustrated in Fig. 1.

It is evident that, although the examples described relate to the application of the brakes of a vehicle, the device according to the invention may be used in all cases where a taking up of the play is necessary in elements whose function is to transmit a tractive effort.

What I claim is:

1. In a device for automatically taking up play in the brake rigging of vehicles, the combination of a rod provided with a helical rack and comprising part of the brake rigging, a compensating clamp and a coupling clamp constituting pawls displaceable relatively to the rack on said rod in one direction only, said clamps being each composed of a plurality of parts forming nut members provided with external conical surfaces, elastic members whereby the parts comprising said nut members are yieldingly connected with each other, spaced abutments, one of which is conical, between which said compensating clamp is movable, and additional spaced abutments, one of which is conical, between which said coupling clamp is movable, the conical abutments being arranged to co-operate with the conical outer surfaces of the associated clamps for coupling said rod to the elements of the brake rigging with which it is designed to co-operate, and the distance between the abutments for the compensating clamp predetermining the extent of permissible play in the brake elements, while the distance between the abutments for the coupling clamp is just sufficient to permit the latter to be disengaged from the helical rack of said rod.

2. In a device for automatically taking up play in the brake rigging of vehicles, the combination of a rod provided with a helical rack and comprising part of the brake rigging, a compensating clamp and a coupling clamp constituting pawls displaceable relatively to the rack on said rod in one direction only, said clamps being each composed of a plurality of parts forming nut members provided with external conical surfaces, elastic members whereby the parts comprising said nut members are yieldingly connected with each other, a pair of casings in limited telescopic sliding engagement with each other surrounding said rod and each enclosing one of said clamps, and two spaced abutments in each of said casings between which said clamps are individually movable, one of each two abutments being conical and arranged to co-operate with the conical outer surface of the associated clamp for coupling said rod to the elements of the brake rigging with which it is designed to co-operate, the distance between the abutments for the compensating clamp predetermining the extent of permissible play in the brake elements, and the distance between the abutments for the coupling clamp being just sufficient to permit the latter to be disengaged from the helical rack of said rod.

3. In a device for automatically taking up play in the brake rigging of vehicles, the combination of a rod provided with a helical rack and comprising part of the brake rigging, a compensating clamp and a coupling clamp constituting pawls displaceable relatively to the rack on said rod in one direction only, said clamps being each composed of a plurality of parts forming nut members provided with external conical surfaces, elastic members whereby the parts comprising said nut members are yieldingly connected with each other, a pair of casings in limited telescopic sliding engagement with each other surrounding said rod and each enclosing one of said clamps, two spaced abutments in each of said casings between which said clamps are individually movable, one of each two abutments being conical and arranged to co-operate with the conical outer surface of the associated clamp for coupling said rod to the elements of the brake rigging with which it is designed to co-operate, the distance between the abutments for the compensating clamp predetermining the extent of permissible play in the brake elements, and the distance between the abutments for the coupling clamp being just sufficient to permit the latter to be disengaged from the helical rack of said rod, a spiral spring having its one end in engagement with one of said casings and its other end portion screw-threaded upon the other casing for normally drawing said casings together, and tubular extensions on said casings for enclosing and protecting the helical rack of said rod.

4. In a device for automatically taking up play in the brake rigging of vehicles, the combination of means including rack teeth comprising part of said brake rigging, a compensating clamp and a coupling clamp constituting pawls displaceable relatively to the rack teeth of said means in one direction only, said clamps being each composed of a plurality of parts forming nut members provided with external conical surfaces, elastic members whereby the parts comprising said nut members are yieldingly connected with each other, two casings capable of being combined with said brake rigging independently of each other to provide enclosures for said clamps, and two spaced abutments in each of said casings between which said clamps are individually movable, one of each two abutments being conical and arranged to co-operate with the conical outer surface of the associated clamp for coupling the rack toothed means to the elements of the brake rigging with which it is designed to co-operate, the distance between the abutments for the compensating clamp predetermining the extent of permissible play in the brake elements, and the distance between the abutments for the coupling clamp being just sufficient to permit the latter to be disengaged from the rack toothed means.

5. In a device for automatically taking up play in the brake rigging of vehicles, the combination of means including rack teeth comprising part of said brake rigging, a compensating clamp and a coupling clamp constituting pawls displaceable relatively to the rack teeth of said means in one direction only, said clamps being each composed of a plurality of parts forming nut members provided with external conical surfaces, elastic members whereby the parts comprising said nut members are yieldingly connected with each other, two spaced abutments mounted upon the chassis of the vehicle and between which the compensating clamp is movable, and two additional spaced abutments mounted upon a predetermined portion of the brake rigging, and between which said coupling clamp is movable, one of each two abutments being conical and arranged to co-operate with the outer conical surface of the associated clamp for coupling the racked toothed means to the elements of the brake rigging with which it is designed to co-operate, the distance between the abutments for the compensating clamp predetermining the extent of permissible play in the brake elements, and the distance between the abutments for the coupling clamp being just sufficient to permit the latter to be disengaged from the rack toothed means.

6. In a device for automatically taking up play in the brake rigging of vehicles, the combination of means including rack teeth comprising part of said brake rigging, a compensating clamp and a coupling clamp constituting pawls displaceable relatively to the rack teeth of said means in one direction only, said clamps being each composed of a plurality of parts forming nut members provided with external conical surfaces, elastic members whereby the parts comprising said nut members are yieldingly connected with each other, two spaced abutments forming part of an element of the brake rigging and between which the compensating clamp is movable, and two additional spaced abutments mounted upon a predetermined portion of the brake rigging and between which the coupling clamp is movable, one of each two abutments being conical and arranged to co-operate with the outer conical surface of the associated clamp for coupling the racked toothed means to the elements of the brake rigging with which it is designed to co-operate, the distance between the abutments for the compensating clamp predetermining the extent of permissible play in the brake elements, and the distance between the abutments for the coupling clamp being just sufficient to permit the latter to be disengaged from the rack toothed means.

7. In a device for automatically taking up play in the brake rigging of vehicles, the combination of a rod provided with a helical rack and comprising part of the brake rigging, a compensating clamp and a coupling clamp constituting pawls displaceable relatively to the rack on said rod in one direction only, said clamps being each composed of a plurality of parts forming nut members provided with external conical surfaces, elastic members whereby the parts comprising said nut members are yieldingly connected with each other, a lever comprising part of said brake rigging, spaced abutments, one of which is conical, between which said compensating clamp is movable, an auxiliary lever having a pivot fixed relatively to the chassis of said vehicle, means whereby said abutments are connected, through said auxiliary lever, with said brake rigging lever, and additional spaced abutments, one of which is conical, between which said coupling clamp is movable, and associated with the elements with which said rod co-operates, the conical abutments co-operating respectively with the conical outer surfaces of the associated clamps for coupling said rod to the elements of the brake rigging with which said rod co-operates, and the distance between the abutments for the compensating clamp predetermining the permissible play in the brake elements, while the distance between the abutments for the coupling clamp is just sufficient to permit the latter to be disengaged from the helical rack of said rod.

8. In a device for automatically taking up play in the brake rigging of vehicles, the combination of two levers one of which is controlled by the brake operating means, extensible connecting means provided with a helical rack and connected with said levers by pivots on which the latter are arranged to rock, a compensating clamp and a coupling clamp constituting pawls on said connecting means and displaceable relatively to the rack thereof in one direction only, said clamps being each composed of a plurality of parts forming nut members provided with external conical surfaces, elastic members whereby the parts comprising said nut members are yieldingly connected with each other, spaced abutments, one of which is conical, between which said compensating clamp is movable, an auxiliary lever having a pivot fixed relatively to the chassis of the vehicle whereby said abutments are connected with one of said two levers, and additional spaced abutments, one of which is conical, between which said coupling clamp is movable and associated with said connecting means, the conical abutments co-operating respectively with the conical outer surfaces of the associated clamps for coupling the latter to said helical rack, and the distance between the abutments for the compensating clamp predetermining the permissible play in the brake elements, while the distance between the abutments for the coupling clamp is just sufficient to permit the latter to be disengaged from the helical rack of said connecting means.

9. In a device for automatically taking up play in the brake rigging of a bogie, the combination of two brake shoes on the same side of said bogie, two pivoted levers carrying said brake shoes, an extensible connecting rod provided with a helical rack and connected with said levers, a compensating clamp and a coupling clamp on said extensible rod displaceable relatively to the helical rack thereof in one direction only, said clamps being each composed of a plurality of parts forming nut members provided with external conical surfaces, elastic members whereby the parts comprising said nut members are yieldingly connected with each other, spaced abutments, one of which is conical, between which said compensating clamp is movable, an auxiliary lever pivotally mounted on the chassis of said bogie, a link connecting said auxiliary lever with one of said brake shoe levers, a second link connecting said auxiliary lever with said abutments whereby the latter are connected, through said auxiliary lever, with said one of said brake shoe levers, and additional abutments, one of which is conical between which said coupling clamp is movable and associated with said extensible connecting rod, the conical abutments co-operating respectively with the conical outer surfaces of the associated clamps for coupling the latter to said helical rack, and the distance between the abutments for said compensating clamp predetermining the permissible play in the brake shoes, while the distance between the abutments for the coupling clamp is just sufficient to permit the latter to be disengaged from the helical rack of said connecting rod.

10. In a device for automatically taking up play in the brake rigging of vehicles, the combination of a rod provided with a helical rack and comprising part of the brake rigging, a compensating clamp and a coupling clamp constituting pawls displaceable relatively to the rack on said rod in one direction only said clamps being each composed of a plurality of parts forming nut members provided with external conical surfaces, elastic members whereby the parts comprising said nut members are yieldingly connected with each other, spaced abutments, one of which is conical, between which said compensating clamp is movable, and additional spaced abutments, one of which is conical, between which said coupling clamp is movable, the conical abutments being arranged to co-operate with the conical outer surfaces of the associated clamps for coupling said rod to the elements of the brake rigging with which it is designed to co-operate, and the distance between the abutments for the compensating clamp predetermining the extent of permissible play in the brake elements, while the distance between the abutments for the coupling clamp is just sufficient to permit the latter to be disengaged from the helical rack of said rod, the normally sharp edge of said rack-teeth being smoothed down.

11. In an automatic slack adjuster, the combination of a rod provided with a helical rack and movable in the direction of its axis, means, including two spaced abutments, one of which is conical, movable lengthwise of said rod, a coupling clamp movable between said abutments and having a conical surface co-operating with the conical abutment whereby said clamp is connected with said rack, the distance between said abutments being just sufficient to permit said clamp to be disengaged from said rack, additional means, including two spaced abutments, one of which is conical, a compensating clamp movable between said last named spaced abutments and having a conical surface co-operating with said last named conical abutment whereby said compensating clamp is connected with said rack, the distance between said last named abutments predetermining the extent of axial movement of said rod beyond which the position of said compensating clamp on said rod is changed to automatically adjust the operative length of said rod in accordance with the amount of play to be compensated.

HANS GALLUSSER.